(12) United States Patent
Yokota et al.

(10) Patent No.: US 11,131,014 B2
(45) Date of Patent: Sep. 28, 2021

(54) METHOD FOR ROUGHENING SURFACE OF SUBSTRATE, METHOD FOR TREATING SURFACE OF SUBSTRATE, METHOD FOR PRODUCING THERMAL SPRAY-COATED MEMBER, AND THERMAL SPRAY-COATED MEMBER

(71) Applicant: TOCALO CO., LTD., Kobe (JP)

(72) Inventors: Hiroki Yokota, Akashi (JP); Daisuke Kawai, Akashi (JP); Tatsuo Suidzu, Akashi (JP)

(73) Assignee: TOCALO CO., LTD., Kobe (JP)

(*) Notice: Subject to any disclaimer, the term of this patent is extended or adjusted under 35 U.S.C. 154(b) by 0 days.

(21) Appl. No.: 15/568,445

(22) PCT Filed: Mar. 23, 2016

(86) PCT No.: PCT/JP2016/059126
§ 371 (c)(1),
(2) Date: Oct. 20, 2017

(87) PCT Pub. No.: WO2016/170895
PCT Pub. Date: Oct. 27, 2016

(65) Prior Publication Data
US 2018/0142338 A1    May 24, 2018

(30) Foreign Application Priority Data
Apr. 21, 2015  (JP) .............................. JP2015-086406

(51) Int. Cl.
*B23K 26/00*    (2014.01)
*C23C 4/02*    (2006.01)
(Continued)

(52) U.S. Cl.
CPC ................ *C23C 4/02* (2013.01); *B23K 26/00* (2013.01); *B23K 26/352* (2015.10); *C23C 4/134* (2016.01);
(Continued)

(58) Field of Classification Search
CPC .......... C23C 4/02; C23C 4/134; C23C 28/04; C23C 8/10; C23C 8/02; C23C 8/80; B23K 26/352; B23K 26/355; B23K 26/00
See application file for complete search history.

(56) References Cited

U.S. PATENT DOCUMENTS 4,931,125 A * 6/1990 Volkmann ............... B29C 59/16
156/272.8
5,473,137 A * 12/1995 Queriaud .............. C04B 37/021
219/121.6
(Continued)

FOREIGN PATENT DOCUMENTS

| CN | 100361936 C | 1/2008 |
| GB | 2397307 A | 7/2004 |

(Continued)

OTHER PUBLICATIONS

International Search Report and Written Opinion for PCT/JP2016/059126 dated May 24, 2016.
(Continued)

*Primary Examiner* — Katherine A Bareford
*Assistant Examiner* — Christina D McClure
(74) *Attorney, Agent, or Firm* — Womble Bond Dickinson (US) LLP; Joseph Bach, Esq.

(57) ABSTRACT

A ceramic substrate is irradiated in an atmospheric air with a laser having a power density of $1.0 \times 10^7$-$1.0 \times 10^9$ W/cm$^2$ for an action time on an irradiation area of $1.0 \times 10^{-7}$-$1.0 \times 10^{-5}$ s to roughen a surface of the ceramic substrate, as well as to form an oxide layer on a roughened surface. A thermal (Continued)

sprayed coating formed on the ceramic substrate sufficiently adheres to the ceramic substrate via the oxide layer.

4 Claims, 4 Drawing Sheets

(51) Int. Cl.
  *B23K 26/352* (2014.01)
  *C23C 28/04* (2006.01)
  *C23C 8/10* (2006.01)
  *C23C 8/02* (2006.01)
  *C23C 8/80* (2006.01)
  *C23C 4/134* (2016.01)

(52) U.S. Cl.
  CPC .............. *C23C 8/02* (2013.01); *C23C 8/10* (2013.01); *C23C 8/80* (2013.01); *C23C 28/04* (2013.01)

(56) References Cited

U.S. PATENT DOCUMENTS

| | | | |
|---|---|---|---|
| 5,558,789 A | 9/1996 | Singh | |
| 5,703,341 A | 12/1997 | Lowndes et al. | |
| 2003/0116276 A1* | 6/2003 | Weldon | C04B 41/0072 |
| | | | 156/345.1 |
| 2005/0016969 A1 | 1/2005 | Kessler et al. | |
| 2007/0161494 A1* | 7/2007 | Fukuyama | C04B 41/009 |
| | | | 501/98.1 |
| 2007/0218630 A1* | 9/2007 | Yamaguchi | B81B 3/001 |
| | | | 438/257 |
| 2008/0264175 A1 | 10/2008 | Leman et al. | |
| 2013/0209745 A1* | 8/2013 | Legoux | C23C 4/02 |
| | | | 428/161 |
| 2014/0349137 A1 | 11/2014 | Brandl et al. | |

FOREIGN PATENT DOCUMENTS

| | | |
|---|---|---|
| JP | 59-121175 A | 7/1984 |
| JP | 61-163258 A | 7/1986 |
| JP | 62-110882 A | 5/1987 |
| JP | 63-108930 A | 5/1988 |
| JP | 64-015294 A | 1/1989 |
| JP | 01-185987 A | 7/1989 |
| JP | 07-116870 A | 5/1995 |
| JP | 10-310859 A | 11/1998 |
| JP | 2000-263260 A | 9/2000 |
| JP | 2003-277169 A | 10/2003 |
| JP | 2005-051238 A | 2/2005 |
| JP | 2007-277620 A | 10/2007 |
| JP | 2008-275617 A | 11/2008 |
| JP | 2010-064952 A | 3/2010 |
| WO | WO-2013091606 A2 * | 6/2013 ........... B23K 26/123 |

OTHER PUBLICATIONS

Shukla, P. P., et al., "Laser shock peening and mechanical shot peening processes applicable for the surface treatment of technical grade ceramics: A review," Institution of Mechanical Engineers, Journal of Engineering Manufacture, vol. 228, No. 5, Dec. 2013, pp. 639-652.

Extended Search Report for European Patent Application No. 16782917.5 dated Oct. 1, 2018.

Office Action in Chinese Patent Application No. 201680022664.5 dated Feb. 2, 2019.

* cited by examiner

[FIG. 1]
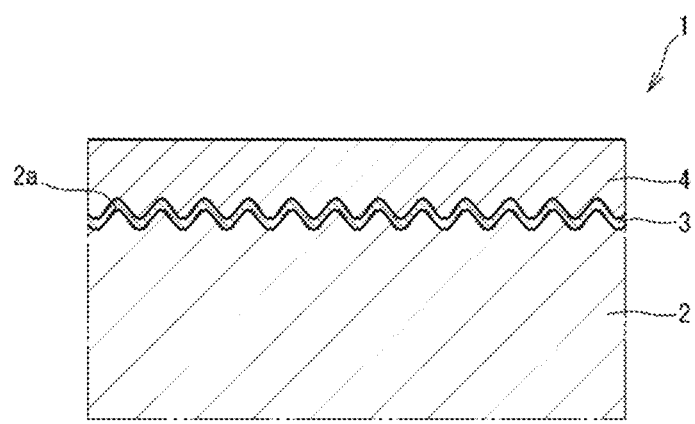

[FIG. 2]
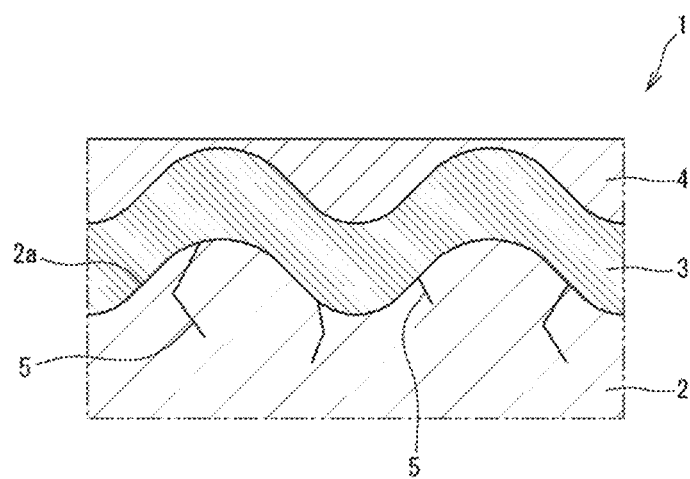

[FIG. 3]
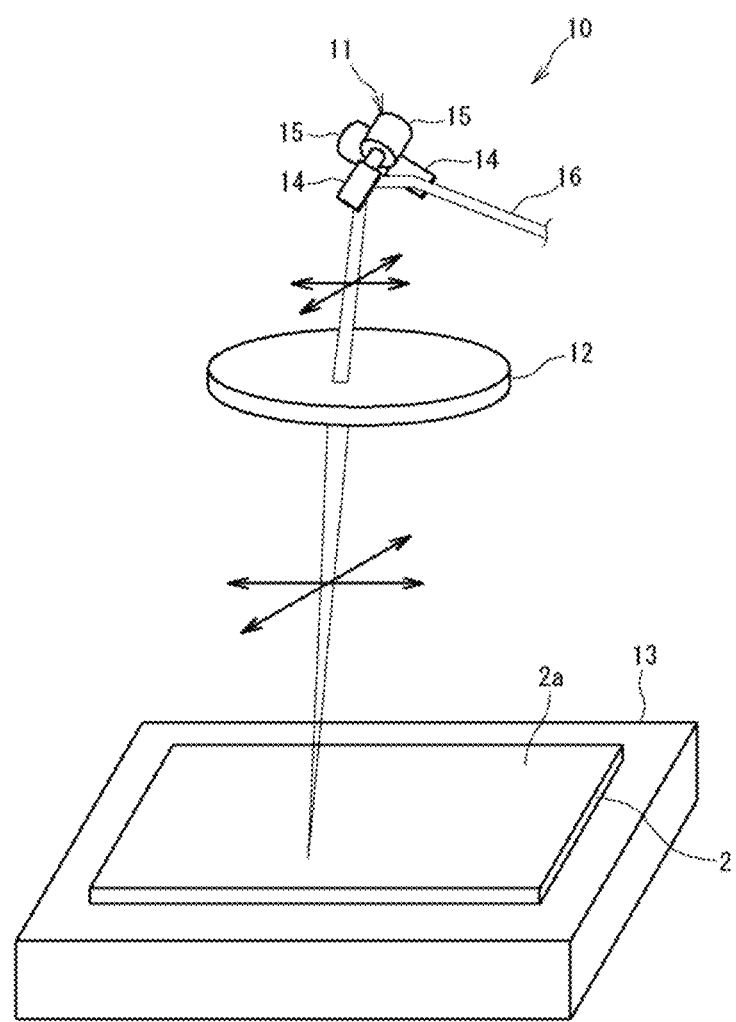

[FIG. 4]
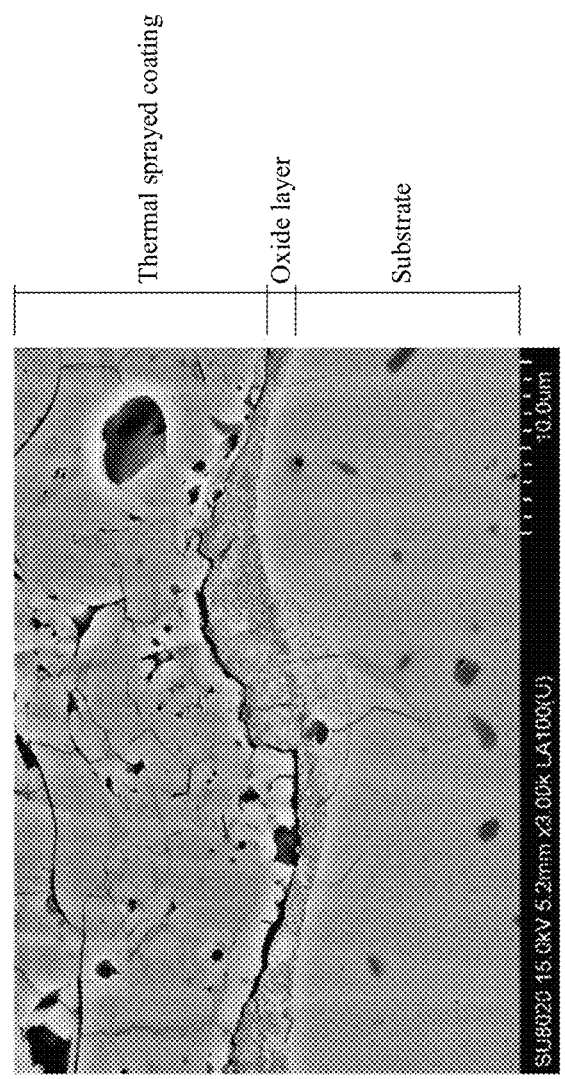

METHOD FOR ROUGHENING SURFACE OF SUBSTRATE, METHOD FOR TREATING SURFACE OF SUBSTRATE, METHOD FOR PRODUCING THERMAL SPRAY-COATED MEMBER, AND THERMAL SPRAY-COATED MEMBER

RELATED APPLICATIONS

The present application is the national phase of International Application No. PCT/JP2016/059126, filed on Mar. 23, 2016, which claims priority to and the benefit of Japanese Patent Application No. 2015-086406, filed on Apr. 21, 2015, and the disclosures of which are hereby incorporated herein by reference in their entireties.

TECHNICAL FIELD

The present invention relates to methods for roughening a surface of a substrate by laser machining, methods for treating the surface of the substrate roughened by laser machining, methods for producing a thermal spray-coated member having a thermal sprayed coating on the surface of the substrate roughened by laser machining, and thermal spray-coated members.

BACKGROUND ART

Formation of various types of thermal sprayed coatings is widely carried out for surfaces of structural members to improve, for example, abrasion resistance of structures. Methods for thermal spraying involve a surface treatment technique to a surface of a workpiece with a thermal sprayed coating, by feeding thermal spray powder, such as ceramics, metals, and cermets, into combustion flame produced by flammable gas or plasma flame formed by, for example, Ar, He and $H_2$, and by having the powder softened or melted, and then by spraying the softened or melted powder at a high velocity on the surface of the workpiece.

Such coating technique often has a challenge in adhesion between the thermal sprayed coating and a substrate that is the workpiece. For promoting adhesion, surface roughening of the substrate is commonly carried out. The best known means for the surface roughening is blasting. In the blasting, roughness is formed on the surface of the substrate by spraying blasting materials that are particles of metals or ceramics, onto the surface at a high velocity. A roughened surface provides improved physical adhesion due to anchoring effect and thus a thermal sprayed coating adheres to the surface.

The blasting does not have a problem, in view of substrate strength, with a substrate made of materials having high ductility and high malleability, such as a substrate made of metals, but with a substrate made of brittle materials, such as a substrate made of ceramics, potentially leads to lower substrate strength.

In contrast, Patent Literature 1 describes that a microblasting process employing masking materials or meshes on a surface of a substrate allows even a substrate made of brittle materials to have reduced substrate warp and to obtain a roughened surface having bumps, resulting in improving the adhesion to a thermal sprayed coating.

Patent Literature 2 describes a new surface roughening technique without blasting, where a substrate with a surface having sharper bumps is obtained by coating a surface of a molded body with adhesives and then with coarse particles, drying the molded body to which the coarse particles adhere to remove excessive particles, and firing the molded body. This technique makes possible strong adhesion to a thermal spray layer without blasting.

Surface roughening techniques made possible by irradiating a substrate with a laser are known as a common technique for surface roughening other than blasting (Patent Literatures 3-9). The following three literatures describe a surface roughening with a laser for a substrate made of ceramics.

Patent Literature 6 describes that a surface made of a rigid inorganic material (e.g., materials having crystallized structure and high covalent, such as SiC using chemical vapor deposition (CVD)) in a surface layer is roughened using a laser beam, and thereby a coating film of an oxide-based inorganic material (e.g., $Y_2O_3$—$SiO_2$ complex oxide) can be particularly well-formed by thermal spraying.

In Patent Literature 7, a method for producing layered composites having a base body made of ceramics and a protective layer made of ceramics is described. In the method, structuring by a laser beam a surface of the base body made of ceramics prior to thermal spraying makes possible desired surface roughening, and then the protective layer subsequently deposited by thermal spraying achieves good adhesion to the roughened surface.

Patent Literature 8 discloses a method for producing a deformation measuring device, comprising (a) a step of repeatedly hitting with a laser a SiC surface of a component that includes a substrate covered with a SiC layer deposited using chemical vapor deposition, in order to increase roughness of the surface, and (b) a step of depositing an alumina coating on the SiC surface under an atmospheric pressure by thermal spraying. Irradiation of a laser beam improves physicochemical properties of the SiC surface, resulting in enhancement of the physicochemical bonding between the alumina coating and the SiC surface.

CITATION LIST

Patent Literature

[Patent Literature 1] Japanese Laid-Open Patent Publication No. 2007-277620
[Patent Literature 2] Japanese Laid-Open Patent Publication No. 2003-277169
[Patent Literature 3] Japanese Laid-Open Patent Publication No. S61-163258
[Patent Literature 4] Japanese Laid-Open Patent Publication No. S63-108930
[Patent Literature 5] Japanese Laid-Open Patent Publication No. H07-116870
[Patent Literature 6] Japanese Laid-Open Patent Publication No. H10-310859
[Patent Literature 7] Japanese Laid-Open Patent Publication No. 2010-064952
[Patent Literature 8] Japanese Laid-Open Patent Publication No. 2008-275617
[Patent Literature 9] Japanese Laid-Open Patent Publication No. 2000-263260

SUMMARY OF INVENTION

Technical Problem

Surface roughening by utilizing a laser solves a problem of lowered adhesion caused by residues left behind for a case of blasting. Moreover, surface roughening with a laser is easy to control as compared with blasting and prevents surface texture from having great variation.

In contrast, a surface roughened by using a laser machining does not necessarily produce strong adhesion as compared with surface roughening in blasting. It requires suitable roughness on a surface of a substrate.

In this regard, surface roughening on a ceramic substrate has a challenge as reduction in substrate strength often occurs. The inventors demonstrate in their study that the lowered substrate strength in blasting is caused by having introduced microcracks in a surface of a substrate made of brittle materials when blasting materials strike the surface. Such microcracks may become a starting point of cracking and may lead to a risk of breaking of the substrate.

Laser machining produces less physical impacts on a surface of a substrate when compared with blasting. The inventors, however, show in their study that small cracks occur in the surface of the substrate even in the laser machining These cracks are not sufficiently large for human bare eye to recognize and thus become visible by observing through a microscope (see FIG. 4, details to follow). In case that one focuses only on enhancing adhesion when forming roughness on the surface of the substrate, the reduction of the substrate strength may follow.

An object of the present invention is thus, in consideration of problems in the conventional techniques, to provide a method for roughening a surface of a substrate, a method for treating the surface of the substrate subjected to a surface roughening, a method for producing a thermal spray-coated member by using those methods, and a thermal spray-coated member, in which even when surface roughening is carried out on a ceramic substrate by laser irradiation, higher substrate strength can be maintained, and strong adhesion is exhibited when forming a thermal sprayed coating on the substrate.

Solution to Problem

The inventors have made keen examination to solve the problems described above. As a result, in view of laser irradiation effectively improving surface texture, the inventors have found that the laser irradiation under specific conditions and in an atmospheric air to a ceramic substrate to roughen a surface significantly contributes to improvement of adhesion to a thermal sprayed coating and the prevention of reduction of substrate strength, allowing the problems to be solved.

The present invention is a method for roughening a surface of a substrate, including roughening a surface of a ceramic substrate by laser irradiation in an atmospheric air with a laser having a power density of $1.0 \times 10^7$-$1.0 \times 10^9$ W/cm$^2$ for an action time on an irradiation area of $1.0 \times 10^{-7}$-$1.0 \times 10^{-5}$ s.

In the present invention, the power density of a laser is adjusted to $1.0 \times 10^7$-$1.0 \times 10^9$ W/cm$^2$ and the action time of the laser on the irradiation area is adjusted to $1.0 \times 10^{-7}$-$1.0 \times 10^{-5}$ s. They are conditions for the laser irradiation to obtain a suitable substrate having strong adhesion without leading to significant reduction of the substrate strength. The present invention is then able to provide a thin oxide layer formed on the roughened surface as the laser irradiation to the ceramic substrate in an atmospheric air under the aforementioned conditions. This allows strong adhesion to a thermal sprayed coating formed on the oxide layer, due to chemical affinity in addition to physical adhesion due to the roughened surface. The oxide layer formed under the aforementioned conditions can cover over microcracks generated at the same time as roughening of the surface by the laser irradiation, and thus prevent the substrate strength from lowering.

Thus, the laser irradiation under the aforementioned conditions allows, together with surface roughening, formation of the oxide layer covering over the roughened surface of the substrate and the microcracks in the substrate, which is generated by the laser irradiation. This reduces effects on the reduction of substrate strength due to the microcracks in the roughened surface, and expands an application range to a structural member requiring high strength.

Suitable types of the ceramic substrate include, but not limited to, a substrate made of silicon carbide, silicon nitride, silicon boride, or a mixture containing one or more of these.

The surface of the substrate obtained by such method for roughening the surface of the substrate preferably undergoes a thermal oxidation treatment. This enables healing of the microcracks responsible for decreasing in substrate strength and densification of the oxide layer formed by the laser irradiation, so that excellent adhesion to the thermal sprayed coating is achieved and the reduction of the substrate strength is further prevented. Moreover, the present invention is a method for treating a surface of a substrate, including conducting a thermal oxidation treatment on the surface of the substrate, which has been roughened by using the aforementioned method for roughening a surface of a substrate.

The substrate obtained by using such method for roughening a surface of a substrate can be preferably utilized as a workpiece to be thermal sprayed. The present invention is also a method for producing a thermal spray-coated member, including conducting a thermal spraying treatment on a substrate, a surface of which has been roughened by using the aforementioned method for roughening a surface of a substrate or treated by using the aforementioned method for treating a surface of a substrate.

Moreover, the present invention is a thermal spray-coated member having a thermal sprayed coating on a substrate, a surface of which has been roughened by using the aforementioned method for roughening a surface of a substrate or treated by using the aforementioned method for treating a surface of a substrate.

The oxide layer covering a roughened surface of the substrate can provide strong adhesion between the oxide layer and a thermal sprayed coating formed thereon. The oxide layer also covers over the roughened surface and microcracks generated in the surface of the substrate due to the laser irradiation, enabling a thermal spray-coated member retaining strength of the workpiece to be thermal sprayed and having high durability.

Advantageous Effects of Invention

The method for roughening a surface of a substrate according to the present invention can provide a substrate with strong adhesion to a thermal sprayed coating and high durability.

The method for treating a surface of a substrate according to the present invention enables improved adhesion to a thermal sprayed coating and prevention of further reduction of substrate strength.

The method for producing a thermal spray-coated member according to the present invention can provide a thermal spray-coated member having a substrate with high durability and a thermal sprayed coating with strong adhesion to the substrate.

The thermal spray-coated member according to the present invention can be applied to a structural member requiring high strength as the member has a substrate with high durability and a thermal sprayed coating with strong adhesion to the substrate.

BRIEF DESCRIPTION OF DRAWINGS

FIG. 1 is a schematic cross-sectional view of a thermal spray-coated member according to one embodiment of the present invention.

FIG. 2 is an enlarged view of part of FIG. 1.

FIG. 3 is a schematic view of a laser machining device for implementing the methods for roughening a surface of a substrate of the present invention.

FIG. 4 is a cross-sectional SEM image of a test piece obtained under conditions as defined in Example 5.

DESCRIPTION OF EMBODIMENTS

Embodiments of the present invention are described with reference to the drawings. FIG. 1 is a schematic cross-sectional view of a thermal spray-coated member 1 according to one embodiment of the present invention. FIG. 2 is an enlarged view of part of FIG. 1. As shown in FIG. 1, the thermal spray-coated member 1 according to the embodiment includes a substrate 2 that is a workpiece having a roughened surface 2a roughened by the laser irradiation, an oxide layer 3 presenting on the roughened surface 2a of the substrate 2, and a thermal sprayed coating 4 covering the substrate 2 via the oxide layer 3.

For example, a SiC material, one of ceramic materials, has high hardness and thus requires certain conditions, such as higher pressure during blasting, to provide sufficient roughness by means of the blasting. The blasting, however, has a challenge in its application as such process gives increased impacts on a substrate and generates large cracks on the substrate, resulting in the decreased substrate strength. In the present invention, the substrate has been roughened by the laser irradiation under the suitable conditions, so that the impacts on the substrate are reduced and the substrate is provided with suitable roughness. Also, an oxide layer 3 is formed at the same time as the laser irradiation. This enables the binding due to chemical affinity, avoiding relying only on physical adhesion caused by anchoring effect.

The substrate 2 used in the present embodiments may be a ceramic substrate suitable for laser machining, including, but not limited to, oxide ceramics (e.g., alumina ($Al_2O_3$)), nitride ceramics (e.g., aluminum nitride (AlN)), boride ceramics, and carbide ceramics. The substrate 2 used in the present embodiments is, preferably, a ceramic substrate containing silicon, more preferably, silicon carbide (SiC), silicon nitride ($Si_3N_4$), silicon boride ($SiB_4$), or a mixture containing one or more thereof (e.g., SiC—$Si_3N_4$, Si—SiC, Si—$Si_3N_4$, and so). As the substrate 2, Sialon (registered trademark, commercially available from Hitachi Metals, Ltd.) can be employed. Such materials are those facilitating formation of the oxide layer 3 (in this case, silicon dioxide ($SiO_2$) layer) under the conditions for the laser irradiation according to the present invention, which provide the oxide layer 3 that enables strong adhesion to the thermal sprayed coating 4 and preservation of the substrate strength.

A surface roughening method for obtaining the roughened surface 2a by irradiating the substrate 2 with a laser is described in detail below. In the present embodiments, a laser can be, in accordance with an irradiating object, selected from, but not limited to, any commonly used laser with continuous oscillation or pulsed oscillation, such as a fiber laser, a semiconductor laser, and a YAG laser. In the following description, the use of the fiber laser with continuous oscillation is intended.

FIG. 3 is a schematic view of a laser machining device 10 for implementing the methods for roughening a surface of a workpiece to be thermally sprayed, according to the present invention. The laser machining device 10 includes a laser oscillator, an optical fiber, a controller and a collimation lens (these are not shown in FIG. 3), and a galvano scanner 11, a fθ lens 12 and a XY table 13 that enables the substrate 2, which is an irradiating object, to move in the X and Y directions (these are shown in FIG. 3).

A laser beam emitted from the laser oscillator is transmitted through the optical fiber and enters the collimation lens positioned at the preceding stage of the galvano scanner 11. The laser beam received by the collimation lens is converted into a parallel light and enters the galvano scanner 11. The galvano scanner 11 includes a galvano mirror 14 as well as an actuator 15 adjusting an angle of the galvano mirror 14. The laser beam 16 is scanned in any patterns by controlling the galvano mirror 14. By suitably adjusting the distance between the fθ lens 12 and the substrate 2, the fθ lens 12 corrects the entering laser beam 16 to be focused onto a plane including the surface of the substrate 2, and thus collects the laser beam. The XY table 13 holds the substrate 2 and moves the substrate 2 in the XY directions.

The controller controls an output and an emission timing of the laser exiting from the laser oscillator and a laser pattern scanned by the galvano scanner 11, based on processing programs and processing conditions for roughening the surface of the substrate 2.

A spot diameter at a focal spot can be controlled with a suitable combination of a core diameter of the optical fiber transmitting a laser and the focal distances of the collimation lens and the fθ lens 12.

There is a limitation to an area of the substrate 2 that can be subjected to scanning by the galvano scanner 11. Thus, once a processing within the area of the substrate 2 that can be subjected to scanning is completed, the XY table 13 moves the substrate 2 to a position at which an unprocessed area of the substrate 2 can be subjected to scanning, and a next processing starts. The surface of the substrate 2 is thus roughened in a pattern provided by a processing program pre-stored in the controller to obtain the roughened surface 2a.

The following is definitions of the power density and the action time in the present invention.

Power density ($W/cm^2$): Output/Spot area ((Spot diameter/2)$^2 \times \pi$)

Action time (s): Time required for a spot of a laser to pass through any point (Spot diameter/Scan rate)

Lens arrangement and the controller of the laser machining device 10 allow adjustments of the power density of a laser to $1.0 \times 10^7$-$1.0 \times 10^9$ $W/cm^2$ and the action time on an irradiation area to $1.0 \times 10^{-7}$-$1.0 \times 10^{-5}$ s. By irradiating the substrate 2 with a laser having those settings in an atmospheric air, roughness is formed on the surface of the substrate 2 to obtain a roughened surface 2a and the oxide layer 3 is simultaneously formed on the roughened surface 2a.

The laser irradiation may be performed one time or multiple times. For example, multiple irradiations with different scanning directions of a laser enable the roughness to be patterned to desired shapes. Regularly defined scanning directions of a laser provide a roughened surface on which projecting parts are created under a certain regularity to be patterned.

The roughened surface 2a of the substrate 2 obtained by the laser irradiation has an arithmetic average roughness (Ra) that is adjusted to, for example, 0.5-30 μm. The roughness of the roughened surface 2a enables excellent adhesion to the thermal sprayed coating 4 due to the anchoring effect. More preferable lower limit of the arithmetic average roughness (Ra) is 2 μm, and more preferable upper limit of the arithmetic average roughness (Ra) is 20 μm.

When the substrate 2 is made of a ceramic material containing silicon, typified by SiC, the oxide layer 3 is a silicon dioxide ($SiO_2$, silica) layer. When the substrate is made of aluminum nitride (AlN), an alumina ($Al_2O_3$) layer is obtained as the oxide layer 3. When the roughened surface 2a is formed on the substrate 2 by the laser irradiation, microcracks 5 generate in a roughened surface layer of the roughened surface 2a due to, for example, shocks created by the laser irradiation. The microcracks 5 have a length of about 5-20 μm in the depth direction and have less effects on the strength of the substrate 2 as compared to blasting. On the other hand, the microcracks 5 possibly cause the significant reduction of the substrate strength and the breaking of the substrate.

In the present embodiments, the substrate 2 is irradiated with a laser where a range of the power density is adjusted to $1.0 \times 10^7$-$1.0 \times 10^9$ W/cm$^2$ and the action time on an irradiation area is adjusted to $1.0 \times 10^{-7}$-$1.0 \times 10^{-5}$ s, and the oxide layer 3 is formed to cover over the microcracks 5 generated in the roughened surface 2a by the laser irradiation. Although the microcracks 5 as described above generate on the roughened surface 2a formed by the irradiation of a laser having the aforementioned settings, the oxide layer 3 is simultaneously formed to cover gaps created by the microcracks 5. As a result, the microcracks 5 are sealed and the reduction of the strength of the substrate 2 is prevented.

In addition, by irradiating the substrate 2 with a laser where the range of the power density is adjusted to $1.0 \times 10^7$-$1.0 \times 10^9$ W/cm$^2$ and the action time on an irradiation area is adjusted to $1.0 \times 10^{-7}$-$1.0 \times 10^{-5}$ s, the oxide layer 3 can be formed over the entire roughened surface 2a, together with surface roughening. This enables exhibiting the strong adhesion between the substrate 2 and the thermal sprayed coating 4. Thus, in the thermal spray-coated member 1, the thermal sprayed coating 4 firmly adheres to the roughened surface 2a via the oxide layer 3.

It is preferred that a thickness of the oxide layer 3 generated by the laser irradiation is 2-20 μm, which can achieve excellent adhesion and sufficient covering effects on the microcracks 5. When the oxide layer 3 has the thickness of less than 2 μm, sufficient adhesion strength may not be obtained. In contrast, when a circumstance allows the oxide layer 3 to have the thickness of more than 20 μm, cracks generated on the substrate by the laser irradiation become to be excessively large, and then the oxide layer 3 may not sufficiently cover over the cracks. More preferred lower and upper limits of the thickness of the oxide layer 3 are 5 μm and 10 μm, respectively.

It is preferred that the roughened surface 2a of the substrate 2 formed by the laser irradiation having the aforementioned settings further undergoes a thermal oxidation treatment. An approach to do so includes a method comprising exposing the roughened surface 2a, for about 5-20 hours, in an atmospheric air in which a temperature has been increased to 800-2000° C. Preferred lower and upper limits of the temperature during the thermal oxidation treatment are 1000° C. and 1500° C., respectively.

For the reason that a ceramic substrate is used as the substrate 2 in the present embodiments, during the aforementioned thermal oxidation treatment, an oxide layer 3 is further formed to fill remaining part of the microcracks 5 having generated due to the laser irradiation and having sealed by the already formed oxide layer 3, and thus the microcracks 5 are covered and healed. Moreover, the growth is accelerated in the inside of the oxide layer 3 having already formed by the laser irradiation, resulting in the densification of the inside of the oxide layer 3. This thermal treatment further improves the adhesion of the oxide layer 3 having already formed by the laser irradiation to the thermal sprayed coating 4, and also further prevents the substrate strength from decreasing.

The aforementioned thermal oxidation treatment has an action largely in the densification of the oxide layer 3 and the healing of the microcracks 5. Accordingly, a thickness of the oxide layer 3 after the thermal oxidation treatment remains the same amount as that of the pre-treatment, that is, about 2 to 20 μm.

The following is explanation of a process for forming a thermal sprayed coating 4, comprising conducting a thermal spraying treatment on the roughened surface 2a on which the foregoing treatment is conducted.

The thermal sprayed coating 4 is formed such that various thermal spray powder that is being softened or melted hits the substrate 2 at high velocity and deposits thereon. Materials constituting the thermal sprayed coating 4 include, but not limited to, metals (including alloys), ceramics, cermets, and the like.

Examples of metals constituting the thermal sprayed coating 4 include a metal element selected from the group consisting of Ni, Cr, Co, Al, Ta, Y, W, Nb, V, Ti, B, Si, Mo, Zr, Fe, Hf, and La, and an alloy containing one or more of those metal elements.

Examples of ceramics constituting the thermal sprayed coating 4 include oxide-based ceramics, nitride-based ceramics, fluoride-based ceramics, carbide-based ceramics, boride-based ceramics, and a mixture thereof, which contains one or more of elements selected from the group consisting of Ni, Cr, Co, Al, Ta, Y, W, Nb, V, Ti, B, Si, Mo, Zr, Fe, Hf, and La.

The oxide-based ceramics include $Al_2O_3$, $Cr_2O_3$, $HfO_2$, $La_2O_3$, $TiO_2$, $Y_2O_3$, $ZrO_2$, $Al_2O_3$—$SiO_2$, NiO, $ZrO_2$—$SiO_2$, $SiO_2$, MgO, and CaO. The nitride-based ceramics include TiN, TaN, AlN, BN, $Si_3N_4$, HfN, NbN, YN, ZrN, $Mg_3N_2$, and $Ca_3N_2$. The fluoride-based ceramics include LiF, $CaF_2$, $BaF_2$, $YF_3$, $AlF_3$, $ZrF_4$, and $MgF_2$. The carbide-based ceramics include TiC, WC, TaC, $B_4C$, SiC, HfC, ZrC, VC, and $Cr_3C_2$. The boride-based ceramics include $TiB_2$, $ZrB_2$, $HfB_2$, $VB_2$, $TaB_2$, $NbB_2$, $W_2B_5$, $CrB_2$, and $LaB_6$.

Cermet materials which are composite materials of metal and ceramic materials may be used as thermal spray materials. The cermet materials include a composite material of a ceramic material selected from the group consisting of $Cr_3C_2$, TaC, WC, NbC, VC, TiC, $B_4C$, SiC, $CrB_2$, WB, MoB, $ZrB_2$, $TiB_2$, $FeB_2$, CrN, $Cr_2N$, TaN, NbN, VN, TiN and BN, and a metal material selected from the group consisting of Ni, Cr, Co, Al, Ta, Y, W, Nb, V, Ti, B, Si, Mo, Zr, Fe, Hf and La.

The thermal spray powder for forming the thermal sprayed coating 4 is, for example, powder having a particle size of about 5-80 μm. The particle size of the thermal spray powder is properly tailored in accordance with fluidity of the powder and coating properties.

A thickness of the thermal sprayed coating 4 is, for example, 50-2000 µm. The thickness of the thermal sprayed coating 4 is appropriately determined in accordance with purpose of its use.

Typically, pores are formed inside the thermal sprayed coating 4 and the average porosity of the coating is, for example, 5-10%. The average porosity varies depending on thermal spraying methods and thermal spraying conditions.

An example of a process for producing a thermal spray-coated member 1 includes steps of cleaning the surface of the substrate 2, roughening the surface of the substrate 2 using a laser, thermal oxidizing the surface of the substrate 2, and thermal spraying to form the thermal sprayed coating 4, with those steps being performed in this order. After the thermal sprayed coating 4 is formed on the roughened surface 2a of the substrate 2, steps of sealing the surface layer, surface grinding, and the like may be carried out for the thermal sprayed coating 4. The process may include other steps, such as preheating, depending on variations in the thermal spray materials.

Thermal spraying methods for forming the thermal sprayed coating 4 include an atmospheric plasma thermal spraying method, a low-pressure plasma thermal spraying method, a high-speed flame thermal spraying method, a gas flame thermal spraying method, an arc thermal spraying method, a detonation thermal spraying method, and the like. Particularly, a plasma thermal spraying method using electrical energy as a heat source utilizes, for example, argon, hydrogen, and nitrogen as a source to generate the plasma in order to form a coating. The high temperature of the heat source and the high speed of flame spraying enable formation of a coating having high density from materials with high melting point.

The use of those thermal spraying methods allows the formation of the thermal sprayed coating 4 having excellent durability and excellent quality. Coating conditions for each thermal spraying method are appropriately determined in accordance with a kind of the substrate 2, a kind of the thermal spray powder, a coating thickness, and an environment for production.

In the method for roughening a surface of a substrate, the method for treating a surface of a substrate, and the method for producing a thermal spray-coated member, according to the present embodiments, the power density is adjusted to $1.0 \times 10^7$-$1.0 \times 10^9$ W/cm$^2$ and the action time on an irradiation area is adjusted to $1.0 \times 10^{-7}$-$1.0 \times 10^{-5}$ s as preferred conditions for the laser irradiation to obtain an advantageous oxide layer 3. In the present embodiments, the oxide layer 3 formed under the aforementioned conditions is present in the roughened surface 2a, and the thermal sprayed coating 4 adheres to the roughened surface 2a of the substrate 2 via the oxide layer 3. This enables the strong adhesion of the thermal sprayed coating 4 to the substrate 2.

The process under the aforementioned conditions permits cracks created in the substrate 2 due to the laser irradiation to be healed, so that the strength of the substrate 2 is maintained. Accordingly, structures including a thermal spray-coated member 1 of the present embodiments avoid reducing the substrate strength and are able to maintain their durability over a long period of time, and can be applied to structural members requiring high strength.

EXAMPLES

Examples of the present invention are described in the following. The present invention is not limited to these examples. A test piece of a thermal spray-coated member was prepared by roughening a surface of a substrate by the laser irradiation to transmute the surface into a roughened surface, and by forming an Al$_2$O$_3$ thermal sprayed coating on the roughened surface. Laser irradiation was carried out with variation in a power density and an action time on an irradiation area by controlling output, scan rate, and spot diameter of the laser. A roughened state of the surface of the test piece was observed after the laser irradiation. An adhesion test for the thermal sprayed coating of the test piece and a bending strength test for the test piece were carried out after forming the Al$_2$O$_3$ thermal sprayed coating.

In Examples 1-8 and Comparative Examples 2-10, the laser irradiation was carried out on one side of a plate material made of SiC and having dimensions of 50×50×6 mm, and a roughened surface was formed in the area which was irradiated with the laser. In Comparative Example 1, blasting was carried out on one side of a plate material made of SiC and having dimensions of 50×50×6 mm, and a roughened surface was formed in the blasted area. Table 1 shows the conditions for the laser irradiation for Examples 1-8 and Comparative Examples 2-10 as well as assessment results for Examples 1-8 and Comparative Examples 1-10. FIG. 4 is a cross-sectional SEM image of the test piece obtained under the conditions as defined in Example 5.

The roughened state of the surface was assessed visually and microscopically. The codes o and x denote surfaces that were roughened and were not roughened, respectively. In Comparative Examples 2-4 and 10, the substrate broke as shown in Table 1. The adhesion was determined by measuring adhesion strength of the thermal sprayed coating to the substrate in accordance with a testing method based on JIS H8300. The code o denotes higher adhesion that is equal to or more than 5 MPa, the code Δ denotes adhesion that is equal to or more than 3 MPa and less than 5 MPa, and the code×denotes lower adhesion that is less than 3 MPa. A three point bend test (Distance between supporting points: 40 mm, Number of test: N=3) was carried out to measure bending strength of the test piece. A lowering rate of the bending strength was calculated in relation to an unprocessed test piece which had not been surface roughened. For example, when an unprocessed test piece has a bending strength of 100 MPa and a processed test piece has that of 60 MP, the lowering rate of the bending strength is 40%.

TABLE 1

|  | Substrate | Power density (W/cm$^2$) | Action time (s) | Roughened state of surface | Adhesion | Lowering rate of bending strength (%) |
|---|---|---|---|---|---|---|
| Ex. 1 | Silicon carbide | $7.6 \times 10^7$ | $1.7 \times 10^{-6}$ | ○ | ○ | 23 |
| Ex. 2 | Silicon carbide | $4.8 \times 10^8$ | $6.7 \times 10^{-7}$ | ○ | ○ | 45 |
| Ex. 3 | Silicon carbide | $7.6 \times 10^7$ | $1.0 \times 10^{-6}$ | ○ | ○ | 18 |

TABLE 1-continued

| | Substrate | Power density (W/cm$^2$) | Action time (s) | Roughened state of surface | Adhesion | Lowering rate of bending strength (%) |
|---|---|---|---|---|---|---|
| Ex. 4 | Silicon carbide | $4.8 \times 10^8$ | $4.0 \times 10^{-7}$ | ○ | ○ | 28 |
| Ex. 5 | Silicon carbide | $7.6 \times 10^7$ | $3.3 \times 10^{-6}$ | ○ | ○ | 35 |
| Ex. 6 | Silicon carbide | $7.6 \times 10^7$ | $1.0 \times 10^{-5}$ | ○ | ○ | 58 |
| Ex. 7 | Silicon carbide | $4.8 \times 10^8$ | $2.0 \times 10^{-7}$ | ○ | ○ | 30 |
| Ex. 8 | Silicon carbide | $1.5 \times 10^7$ | $3.3 \times 10^{-6}$ | ○ | ○ | 23 |
| Com. Ex. 1 | Silicon carbide | — | — | ○ | X | 85 |
| Com. Ex. 2 | Silicon carbide | $7.6 \times 10^7$ | $1.0 \times 10^{-4}$ | Substrate broke | — | — |
| Com. Ex. 3 | Silicon carbide | $7.6 \times 10^7$ | $5.0 \times 10^{-4}$ | Substrate broke | — | — |
| Com. Ex. 4 | Silicon carbide | $7.6 \times 10^7$ | $5.0 \times 10^{-3}$ | Substrate broke | — | — |
| Com. Ex. 5 | Silicon carbide | $7.6 \times 10^6$ | $3.3 \times 10^{-6}$ | ○ | X | 30 |
| Com. Ex. 6 | Silicon carbide | $3.8 \times 10^6$ | $3.3 \times 10^{-6}$ | X | — | — |
| Com. Ex. 7 | Silicon carbide | $1.3 \times 10^6$ | $3.3 \times 10^{-6}$ | X | — | — |
| Com. Ex. 8 | Silicon carbide | $3.7 \times 10^9$ | $1.0 \times 10^{-8}$ | ○ | X | 15 |
| Com. Ex. 9 | Silicon carbide | $3.8 \times 10^8$ | $1.0 \times 10^{-8}$ | X | — | — |
| Com. Ex. 10 | Silicon carbide | $3.7 \times 10^9$ | $3.3 \times 10^{-6}$ | Substrate broke | — | — |

The following is a state of each test piece after the roughening.
Examples 1-8: Positively roughened surface having an oxide layer thereon was obtained.
Comparative Examples 2-4: Substrate broke due to a too long action time of the laser irradiation
Comparative Example 5: Oxide layer was not formed due to a too small power density of a laser.
Comparative Examples 6 and 7: Surface was not roughened due to a too small power density of a laser.
Comparative Example 8: Oxide layer was not formed due to a too short action time of the laser irradiation.
Comparative Example 9: Surface was not roughened due to a too short action time of the laser irradiation.
Comparative Example 10: Substrate broke due to a too long action time of the laser irradiation in relation to a power density of the laser.

Examples 1-8 show an excellent roughened state of the surface and a stronger adhesion of the thermal sprayed coating, and the lowering rate of bending strength maintained at equal to or less than 60%. Comparative Example 1 in which blasting was carried out exhibits a lower adhesion and a significantly reduced bending strength. In Comparative Examples 2-10, the conditions for the laser irradiation were not appropriate to, and thus the substrate broke, the surface was not roughened, and a low adhesion and a lower bending strength were obtained.

Next, under the same conditions for the laser irradiation as described in Example 5, a test piece of a thermal spray-coated member was prepared by roughening a surface of a substrate by the laser irradiation to transmute the surface into a roughened surface, and by forming an Al$_2$O$_3$ thermal sprayed coating on each roughened surface, where the substrate was a plate material made of silicon nitride (Si$_3$N$_4$), aluminum nitride (AlN), or alumina (Al$_2$O$_3$) instead of silicon carbide (SiC). The adhesion test for the thermal sprayed coating and the bending strength test for the test piece were carried out. The results are shown in Table 2.

TABLE 2

| | Substrate | Power density (W/cm$^2$) | Action time (s) | Roughened state of surface | Adhesion | Lowering rate of bending strength (%) |
|---|---|---|---|---|---|---|
| Ex. 9 | Silicon nitride | $7.6 \times 10^7$ | $3.3 \times 10^{-6}$ | ○ | ○ | 33 |
| Ex. 10 | Aluminum nitride | $7.6 \times 10^7$ | $3.3 \times 10^{-6}$ | ○ | ○ | 35 |
| Ex. 11 | Alumina | $7.6 \times 10^7$ | $3.3 \times 10^{-6}$ | ○ | Δ | 27 |

Example 9 with silicon nitride (Si$_3$N$_4$) used as the substrate and Example 10 with aluminum nitride (AlN) used as the substrate showed an excellent roughened state of the surface, a stronger adhesion of the thermal sprayed coating, and a reduced lowering rate of bending strength. On the other hand, in Example 11 with alumina (Al$_2$O$_3$) used as the substrate, the adhesion was less than good, but utilizable, and the roughened state of the surface was excellent, and the lowering rate of bending strength was reduced.

Further, under the same conditions for the laser irradiation as described in Example 5, a test piece of a thermal spray-coated member was prepared by roughening a surface of a substrate by the laser irradiation to transmute the surface into a roughened surface, and by forming an $Al_2O_3$ thermal sprayed coating on the roughened surface after further conducting a thermal oxidation treatment on the roughened surface for 10 hours in an electric furnace (in atmospheric air) at 1200° C. Then, under the same conditions for blasting as described in Comparative Example 1, a test piece of a thermal spray-coated member was prepared by blasting a surface of a substrate to transmute the surface into a roughened surface, and by forming an $Al_2O_3$ thermal sprayed coating on the roughened surface after further conducting a thermal oxidation treatment on the roughened surface for 10 hours in the electric furnace (in atmospheric air) at 1200° C. The adhesion test for the thermal sprayed coating and the bending strength test for the test piece were carried out. The results are shown in Table 3.

TABLE 3

| | Roughened state of surface | Adhesion | Lowering rate of bending strength (%) |
|---|---|---|---|
| Ex. 12 (Ex. 5 + Thermal treatment (1200° C.)) | ◯ | ◯ | 12 |
| Com. Ex. 11 (Com. Ex. 1 + Thermal treatment (1200° C.)) | ◯ | X | 63 |

Example 12 shows improved adhesion and bending strength, as a result of a further oxidation treatment for the roughened surface facilitated by the thermal treatment which is carried out after roughening the surface of the substrate by the laser irradiation and before forming and coating the thermal sprayed coating on the roughened surface. In contrast, Comparative Example 11 shows slightly improved bending strength due to the oxidation treatment for the roughened surface facilitated by the thermal treatment which is carried out after roughening the surface of the substrate by blasting and before forming and coating the thermal sprayed coating on the roughened surface. However, the bending strength is still insufficient. In Comparative Example 11, the surface was roughened by blasting at a level that would nevertheless not break the substrate, so that formation of roughness is insufficient and thus a good adhesion is not achieved.

The embodiments and examples described above are intended to be illustrative, and not limiting. The methods for roughening a surface of a substrate, the methods for treating a surface of a substrate, the methods for producing a thermal spray-coated member, and the thermal spray-coated members, according to the present invention, are applicable to any use in, for example, automotive industries, and semiconductor industries.

DESCRIPTION OF REFERENCE CHARACTERS

1 Thermal spray-coated member
2 Substrate (Workpiece)
2a Roughened surface
3 Oxide layer
4 Thermal sprayed coating
5 Microcracks
10 Laser machining device
11 Galvano scanner
12 fθ lens
13 XY table
14 Galvano minor
15 Actuator
16 Laser beam

The invention claimed is:

1. A method for roughening a surface of a substrate, comprising roughening a surface of a ceramic substrate made of silicon carbide by scanning the surface with a continuous oscillation laser irradiation in an atmospheric air with a laser having a power density of $1.0 \times 10^7$-$1.0 \times 10^9$ W/cm$^2$ for an action time (spot diameter/scan rate) on an irradiation area of $1.0 \times 10^{-7}$-$1.0 \times 10^{-5}$s, and wherein:
at the same time as the roughening of the surface by laser irradiation, an oxide layer is formed, which covers over the surface roughened and microcracks generated in the surface roughened;
the surface roughened has an arithmetic average roughness (Ra) of 2-30 μm; and, a thickness of the oxide layer is 2-20 μm.

2. A method for treating a surface of a substrate, comprising conducting a thermal oxidation treatment on a surface of a substrate, which has been roughened by using the method according to claim 1.

3. A method for producing a thermal spray-coated member, comprising conducting a thermal spraying treatment on a substrate, a surface of which has been treated by using the method according to claim 2.

4. A method for producing a thermal spray-coated member, comprising conducting a thermal spraying treatment on a substrate, a surface of which has been roughened by using the method according to claim 1.

* * * * *